United States Patent Office 2,925,409
Patented Feb. 16, 1960

2,925,409

GERMANIUM CATALYST AND PROCESS OF POLYMERIZING AN α-MONOOLEFINIC HYDROCARBON THEREWITH

Newton H. Shearer, Jr., and Harry W. Coover, Jr., Kingsport, Tenn., assignors to Eastman Kodak Company, Rochester, N.Y., a corporation of New Jersey No Drawing. Application July 10, 1957
Serial No. 670,869

14 Claims. (Cl. 260—93.7)

This invention relates to the polymerization of α-monoolefinic hydrocarbons to solid polymer. In a specific aspect this invention relates to the catalytic polymerization of ethylene and homologs of ethylene at relatively low pressures to give solid high density polymer using a catalyst mixture of a new composition. In another aspect this invention relates to novel catalysts for the polymerization of ethylene and its homologs.

For a number of years, ethylene has been polymerized to solid polymer of relatively low crystallinity and low density by means of very high pressure processes as described in Fawcett et al. 2,153,553 wherein pressures in excess of 500 atmospheres and usually of the order of 1000–2000 atmospheres have been employed to give solid waxy polymers which are characterized by extreme flexibility and a softening temperature of the order of 100° C.

More recently, the so-called high density polyethylene having an increased softening temperature, greater stiffness and greater crystallinity has been prepared by a number of catalytic processes, and this higher density material offers a means whereby more rigid articles can be molded or cast from polyethylene, which articles have a high softening temperature and are resistant to deformation by contact with boiling water. The catalytic mixtures which have become known to the art for forming the high density polyethylene generally fall into two main classes. One class involves the use of certain metal oxides in partially reduced form, such as partially reduced molybdenum oxide, in combination with an alkali metal compound as activator. The other class of catalysts usually consists of compounds, such as metal alkyls and metal hydrides, which are used in conjunction with a transition metal compound. The metals for the metal alkyls and metal hydrides have heretofore been chosen from the metals in groups I, II and III of the periodic table. Frequently, an organoaluminum compound, such as aluminum triethyl, or an alkyl aluminum halide, such as ethyl aluminum sesquibromide, is used in conjunction with a titanium compound, such as titanium tetrachloride.

The metal oxide catalysts must usually be used in the form of a supported catalyst and are subject to inactivation during use by deposition of polymer on the catalyst. The organo aluminum compounds are expensive to prepare and are extremely pyrophoric in nature and hence difficult to handle in commercial operations. Although a number of catalytic mixtures are known for polymerizing ethylene and its homologs to solid polymer, the polymerization does not follow any regular pattern, and it has been difficult to postulate any theory to explain why particular combinations of materials give solid polyethylene whereas other combinations do not. Furthermore, some of the catalyst combinations have been useful only for polymerizing ethylene to solid polymer but not for polymerizing propylene and higher olefins to solid polymer whereas some catalysts are effective for both types of olefins. Also, the compounds which can be used in combination vary widely and certain compounds which are quite effective in one combination are wholly ineffective in other combinations. Additionally, prior to our invention it was not known that compounds of metals in group IVA of the periodic table possessed catalytic activity for hydrocarbon polymerization reactions.

It is an object of this invention to provide a novel method of polymerizing α-mono-olefinic hydrocarbons to solid polymer in good yield using a catalyst combination which has not been used heretofore for olefin polymerization.

Another object of the invention is to provide a new catalyst combination which is highly effective for polymerizing ethylene and its homologs to solid polymer.

Other objects will be apparent from the description and claims which follow.

These and other objects are attained by means of this invention wherein it was found unexpectedly that α-mono-olefinic hydrocarbons, either singly or in admixture, could be converted in high yield to high molecular weight, highly crystalline solid polymers without the concomitant formation of low molecular weight waxy or liquid polymers by effecting the polymerization in the presence of a catalytic mixture of a germanium hydride and a halide of a transitional metal from groups IVB, VB, and VIB of the periodic table. This combination of two materials which in themselves have not been known to possess utility for polymerizing olefins to yield low or high molecular weight liquid or solid polymers, gives results which are comparable to or better than the best catalytic processes known heretofore for making solid polymers of improved crystallinity, melting point, and rigidity. Insofar as is known, germanium hydrides have not been recognized as having any utility in the polymerization of olefins. Furthermore, halides of certain transitional metals have found utility only as activators for such materials as the metal alkyls which already possess utility as polymerization catalysts. The reason why the two-component mixture exhibits the high degree of catalytic activity is not readily understood and could not be predicted from the art wherein it is apparent that the catalytic activity is empirical and unpredictable. An especially advantageous aspect of the two-component catalyst system embodying this invention is that the desired solid hydrocarbon polymer is not only formed in very high yield but that the concomitant formation of undesirable low molecular weight waxy or liquid polymer is obviated.

The components of the catalysts within the scope of our invention have not been known to be catalysts for polymerization of olefins even to form liquid polymers. When the two components are employed in combination, however, the apparently synergistic mixture possesses a high degree of activity at temperatures as low as room temperatures or lower and at pressures as low as atmospheric pressure. The relative proportions of the two components can be varied quite widely, although best results are obtained when from 0.5 to 10 moles of germanium hydride are employed per mole of metal halide. Concentrations outside this range can be used but they are usually undesirable from an economic standpoint.

In the catalyst mixture of this invention halides of any of the transitional metals in groups IVB, VB and VIB can be used, and specifically halides of titanium, vanadium, chromium, and molybdenum have been employed. For example, titanium tetrachloride, vanadium tetrachloride, chromyl chloride and molybdenum pentachloride are quite satisfactory, and other halides of these metals, e.g. titanium tetrabromide and titanium tetraiodide are within the scope of our invention.

The germanium hydrides that can be used in our catalyst composition can be represented by the structural formula $R_3GeH$ wherein R is selected from the group consisting of phenyl, alkyl radicals containing from 1 to 8 carbon atoms, and cycloaliphatic radicals containing up to 8 carbon atoms. Thus, R represents phenyl, methyl, ethyl, butyl, hexyl, octyl, cyclohexyl, cyclobutyl, methylcyclohexyl, ethylcyclohexyl, as well as similar alkyl and cycloalkyl radicals.

The inventive process is carried out in liquid phase in an inert organic liquid, and preferably an inert liquid hydrocarbon vehicle, and the removal of catalyst is facilitated by operating below the melting point of the polymer. The process proceeds with excellent results over a relatively wide temperature range with temperatures of 0–250° C. being preferably employed, and particularly good results being obtained in the range of 25–175° C. The pressure can be varied as desired, with pressures as low as atmospheric pressure being operable. Generally speaking, however, it is desirable to employ a pressure in the range of 0–1000 p.s.i.g. with pressures of from 10 to 1000 p.s.i.g. being preferred for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and as a solvent for the solid polymerization products at the temperature of polymerization. The great increase in polymerization rate with increasing pressures makes the use of pressures of 300–500 p.s.i. desirable.

The invention is applicable for polymerizing any of the well known α-mono-olefinic hydrocarbons and preferably those containing from 2 to 10 carbon atoms. In most cases, the invention is particularly applicable for polymerizing ethylene, propylene or mixtures thereof, although any of the mono-olefins can be used or any mixtures of mono-olefins depending upon the type of product desired. When ethylene is employed as the monomer, the polyethylene obtained has a softening point or fusion point of about 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-mono-olefins and particularly with propylene. Other mono-olefins which are suitably employed either alone or in admixtures include such materials as 1-butene, 3-methyl-1-butene, 4-methyl-1-pentene, 4,4-dimethyl-1-pentene, 1-pentene, 1-hexene, allylbenzene, styrene, vinylcyclohexane, allylcyclohexane, and the like. In some cases, it is desirable to prepare copolymers of the α-mono-olefins in order to modify the properties for particular uses such as in molding or extrusion applications. Thus, copolymers of 5–95% ethylene with 95–5% propylene are desirably prepared in many cases.

The catalyst mixtures embodying this invention have several important advantages over the prior art processes. For example, the rate of polymerization is much faster than is ordinarily achieved with other catalysts known heretofore, and the same degree of polymerization can be achieved in a few hours using the present catalyst system as required several days heretofore. Another advantage of the invention is that relatively lower pressures can be used with pressures as low as atmospheric pressure being operable. Ordinarily, moderate pressures of the order of 10–1000 p.s.i.g. are employed, but the use of such pressures still allows considerable economy over the conventional high pressure processes which operate in the range of 1000–2000 atmospheres in most cases. A further important advantage is the high yield of solid high density polymer without the concomitant formation of waxy, greasy or oily polymers.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. Since the catalyst mixture employed consists of components which are either readily soluble or readily dispersible in the organic liquid vehicles commonly employed, the uniformity of reaction can be readily controlled. The exact nature of the catalytic action between the components of the mixture is not wholly understood, and particularly the reason why the mixture has such greatly increased activity is not understood. The catalyst can be separated from the polymer by any of several methods. A convenient method is to wash the product in methanol, dissolve the polymer in a xylene-2-ethylhexanol mixture and reprecipitate the polymer by cooling the solution. The reprecipitated polymer is then filtered, heated with methanolic hydrochloric acid to remove unreacted metal and washed free of acid with methanol. Alternatively, the crude polymer can be washed with methanol, heated with dilute solutions of sodium hydroxide and methanol, and finally washed with methanol and water. Either sequence affords completely colorless polymer.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-mono-olefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from 0–250° C. can be employed as desired, the usual process adapted for commercial production is carried out at a temperature in the range of from 25–175° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 10 to 1000 p.s.i.g. obtained by pressuring the system with the monomer being polymerized. The amount of vehicle employed can be varied over rather wide limits with relation to the monomer and catalyst mixture. Best results are obtained using a concentration of catalyst of from about 0.01 to about 20% and higher and desirably 0.1 to 5% by weight in the vehicle. The preferred range is 0.1–2%. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The two-component catalyst mixtures embodying the invention are particularly advantageous for commercial production because of the extreme simplicity of the catalyst mixture. The nature of the catalysis and the reason why the mixtures herein defined give the highly crystalline solid polymers is not understood, and the invention will not be limited by any theory which might be proposed by way of explanation. Because of their quite different characteristics as regards such properties as melting point, crystallinity, rigidity, tensile strength and the like, the high molecular weight, highly crystalline solid polymers of this invention are in the nature of different phastic materials from the more flexible and lower melting polyethylenes known to the art heretofore.

The catalysts embodying the invention can be used in the absence of solvent, but it is desirable to employ an anhydrous liquid vehicle for purposes of ready temperature control. The catalyst concentration is also preferably maintained in the range of from about 0.1% to about 3% for ready temperature control. When it is desired to effect the polymerization at room temperature or below, it is preferable to first heat the catalyst mixture either in the absence or presence of olefin monomer for a short time in order to achieve more rapid polymerization rates at such lower temperatures. A temperature of 50° C. or higher is sufficient for such pretreatment. Although close temperature control during the polymerization is desirable for obtaining a very uniform polymer, broad molecular weight distribution can be obtained by changing the temperature during the course of the polymerization.

The invention is illustrated by the following examples of certain preferred embodiments thereof.

*Example 1*

In a dry box filled with dry, oxygen-free nitrogen a 500 ml. pressure bottle was loaded with 100 ml. of dry heptane, 1.0 g. of triethylgermanium hydride, and 1.0 g. of titanium tetrachloride. The bottle and contents were attached to a source of ethylene and agitated at room temperature and 30 p.s.i. ethylene pressure for 6 hours. The product was washed with methanol containing a little hydrochloric acid and then with water. A 23-g. yield of high-molecular-weight polyethylene having a softening point of 125–130° C. was obtained.

*Example 2*

The procedure of Example 1 was employed with propylene as the monomer and using 2.0 g. of trimethylgermanium hydride plus 1.0 g. of titanium trichloride as the catalyst. The polymerization temperature was 80° C. After 6 hours a 17-g. yield of polypropylene having a high-molecular weight and a softening point above 155° C. was obtained.

*Example 3*

In a dry box filled with dry, oxygen-free nitrogen a 300-ml. autoclave was loaded with 100 ml. of heptane, 1.0 g. of triphenylgermanium hydride plus 1.0 g. of vanadium tetrachloride. A 100-g. portion of dry 3-methyl-1-butene was metered into the loaded autoclave. The polymerization was run at 175° C. for 8 hours. A 25-g. yield of high molecular weight poly-3-methyl-1-butene having a softening point above 245° C. was obtained.

*Example 4*

The procedure of Example 3 was employed using 4-methyl-1-pentene as the monomer and 1.5 g. of tricyclohexyl germanium hydride plus 0.5 g. molybdenum pentachloride as the catalyst. The polymerization was run at 150° C. for 8 hours. A 30-g. yield of high-molecular weight poly-4-methyl-1-pentene having a softening point above 235° C. was obtained.

*Example 5*

The procedure of Example 3 was employed using 4,4-dimethyl-1-pentene as the monomer and 5.0 g. of trioctylgermanium hydride plus 1.0 g. of chromyl chloride as the catalyst. After an 8-hour polymerization period at 200° C. a yield of 17 g. of high molecular weight poly-4,4-dimethyl-1-pentene having a softening point above 300° C. was obtained.

*Example 6*

The procedure of Example 2 was employed at a polymerization temperature of 90° C. to obtain good yields of high molecular weight, highly crystalline polyolefins from each of the following monomers: 1-butene, styrene, allylbenzene, allylcyclohexane and allylcyclopentane.

The germanium hydrides used in the catalyst compositions of this invention can be prepared by reacting the corresponding germanium chloride with lithium aluminum hydride. For example, in this manner triethyl germanium hydride can be readily prepared from triethyl germanium chloride.

The alkyl or aryl germanium hydride catalysts of this invention have particular advantages over the Ziegler-type catalysts such as triethylaluminum. For example, in the preparation of poly-3-methyl-1-butene according to Example 3 above, the product contains a very high percentage (80–90%) of crystalline polymer and only minor amounts of rubbery polymer. On the other hand, if triethylaluminum is used in place of the germanium catalyst, the product contains 50% or more of rubbery polymer. In the same manner a catalyst made using titanium tetrachloride and the germanium compounds of this invention gives a polymer of propylene containing a high percentage of crystalline polypropylene (80–90%) whereas a catalyst made by mixing titanium tetrachloride and triethylaluminum gives a polymer of propylene containing 50% or more of rubbery polypropylene. The reason for this is not clearly understood but it may be due to the fact that germanium halides are less acidic than aluminum halides. The aluminum halides which form when aluminum alkyls are mixed with titanium tetrachloride, for example, are probably acidic enough to cause an acid-type catalysis leading to rubbery polypropylene and rubbery polymers of the other higher olefins.

The germanium catalysts of this invention are generally superior to the Ziegler catalysts with respect to giving a more highly crystalline polymer of propylene and the higher 1-olefins.

We claim:

1. The process for producing high molecular weight hydrocarbon polymers which comprises polymerizing an α-monoolefinic hydrocarbon in a normally liquid, inert hydrocarbon solvent and with a catalytic mixture consisting essentially of a germanium hydride having the formula: $R_3GeH$, wherein R is selected from the group consisting of alkyl radicals containing from 1–8 carbon atoms, cycloalkyl radicals and phenyl and a halide of a transition metal selected from the group consisting of titanium, vanadium, chromium and molybdenum, said mixture containing from 0.5–10 moles of germanium hydride per mole of transition metal halide.

2. The process for producing high molecular weight hydrocarbon polymers which comprises polymerizing an α-monoolefinic aliphatic hydrocarbon containing from 2–10 carbon atoms in a normally liquid, saturated, aliphatic hydrocarbon solvent and with a catalytic mixture consisting essentially of a trialkyl germanium hydride wherein the alkyl radicals contain from 1–8 carbon atoms and a halide of a transition metal selected from the group consisting of titanium, vanadium, chromium, and molybdenum, said catalytic mixture containing from 0.5–10 moles of germanium hydride per mole of transition metal halide.

3. As a composition of matter a catalyst for producing high molecular weight polymeric hydrocarbons, said catalyst being a mixture of a germanium hydride having the formula: $R_3GeH$, wherein R is selected from the group consisting of alkyl radicals containing from 1–8 carbon atoms, cycloalkyl radicals and phenyl and a halide of a transition metal selected from the group consisting of titanium, vanadium, chromium and molybdenum, said mixture containing from 0.5–10 moles of germanium hydride per mole of transition metal halide.

4. As a composition of matter a catalyst for producing high molecular weight polymeric hydrocarbons, said catalyst being a mixture of a trialkyl germanium hydride wherein the alkyl groups contain from 1–8 carbon atoms and a halide of a transition metal selected from the group consisting of titanium, vanadium, chromium and molybdenum, said catalytic mixture containing from 0.5–10 moles of germanium hydride per mole of transition metal halide.

5. As a composition of matter a catalyst for producing high molecular weight polymeric hydrocarbons, said catalyst being a mixture of from 0.5–10 moles of triethyl germanium hydride per mole of titanium tetrachloride.

6. As a composition of matter a catalyst for producing high molecular weight polymeric hydrocarbons, said catalyst being a mixture of from 0.5–10 moles of trimethyl germanium hydride per mole of titanium trichloride.

7. As a composition of matter a catalyst for producing high molecular weight polymeric hydrocarbons, said catalyst being a mixture of from 0.5–10 moles of triphenylgermanium hydride per mole of vanadium tetrachloride.

8. As a composition of matter a catalyst for producing high molecular weight polymeric hydrocarbons, said catalyst being a mixture of from 0.5–10 moles of tricyclohexylgermanium hydride per mole of molybdenum pentachloride.

9. As a composition of matter a catalyst for producing high molecular weight polymeric hydrocarbons, said catalyst being a mixture of from 0.5–10 moles of trioctylgermanium hydride per mole of chromyl chloride.

10. The process for producing high molecular weight polyethylene which comprises polymerizing ethylene in a normally liquid saturated aliphatic hydrocarbon solvent and with a catalytic mixture consisting essentially of triethyl germanium hydride and titanium tetrachloride at a temperature within the range of 0–250° C. and a pressure within the range of 0–1000 p.s.i.g., said catalyst mixture containing from 0.5 to 10 moles of triethyl germanium hydride per mole of titanium tetrachloride.

11. The process for producing high molecular weight polypropylene which comprises polymerizing propylene in a normally liquid, saturated, aliphatic hydrocarbon solvent with a catalytic mixture consisting essentially of trimethyl germanium hydride and titanium trichloride at a temperature within th range of 0–250° C. and a pressure within the range of 0–1000 p.s.i.g., said catalytic mixture containing from 0.5 to 10 moles of trimethyl germanium hydride per mole of titanium trichloride.

12. The process for producing high molecular weight, polymeric hydrocarbon which comprises polymerizing 3-methyl-1-butene in a normally liquid, saturated, aliphatic hydrocarbon solvent with a catalytic mixture consisting essentially of triphenyl germanium hydride and vanadium tetrachloride at a temperature within the range of 0.250° C. and a pressure within the range of 0–1000 p.s.i.g., said catalytic mixture containing from 0.5 to 10 moles of triphenyl germanium hydride per mole of vanadium tetrachloride.

13. The process for producing high molecular weight, polymeric hydrocarbon which comprises polymerizing 4-methyl-1-pentene in a normally liquid, saturated, aliphatic hydrocarbon solvent with a catalytic mixture consisting essentially of tricyclohexyl germanium hydride and molybdenum pentachloride at a temperature within the range of 0–250° C. and a pressure within the range of 0–1000 p.s.i.g., said catalytic mixture containing from 0.5 to 10 moles of tricyclohexyl germanium hydride per mole of molybdenum pentachloride.

14. The process for producing high molecular weight, polymeric hydrocarbon which comprises polymerizing 4,4-dimethyl-1-pentene in a normally liquid, saturated aliphatic hydrocarbon with a catalytic mixture consisting essentially of trioctyl germanium hydride and chromyl chloride at a temperature within the range of 0–250° C. and a pressure within the range of 0–1000 p.s.i.g., said catalytic mixture containing from 0.5 to 10 moles of trioctyl germanium hydride per mole of chromyl chloride.

References Cited in the file of this patent

UNITED STATES PATENTS

| | | |
|---|---|---|
| 2,827,447 | Nowlin et al. | Mar. 18, 1958 |

FOREIGN PATENTS

| | | |
|---|---|---|
| 538,782 | Belgium | Dec. 6, 1955 |

UNITED STATES PATENT OFFICE
CERTIFICATE OF CORRECTION

Patent No. 2,925,409                                          February 16, 1960

Newton H. Shearer, Jr., et al.

It is hereby certified that error appears in the printed specification of the above numbered patent requiring correction and that the said Letters Patent should read as corrected below.

Column 2, lines 52 and 53, for "temperatures" read -- temperature --; column 6, line 26, for "phastic" read -- plastic --; column 8, line 67, for "th" read -- the --; column 9, line 2, for "0.250° C." read -- 0-250° C. --.

Signed and sealed this 16th day of August 1960.

(SEAL)
Attest:

KARL H. AXLINE                                        ROBERT C. WATSON
Attesting Officer                                     Commissioner of Patents